United States Patent [19]

Knebl et al.

[11] Patent Number: 4,780,324

[45] Date of Patent: Oct. 25, 1988

[54] CHEWING GUM WITH LONG LASTING SOFTNESS

[75] Inventors: Leslie F. Knebl, Morristown, N.J.; Zoltan Bodor, Pickering, Canada

[73] Assignee: Warner-Lambert Company, Morris Plains, N.J.

[21] Appl. No.: 65,798

[22] Filed: Jun. 24, 1987

[30] Foreign Application Priority Data

Jun. 23, 1987 [CA] Canada .................................. 540419

[51] Int. Cl.$^4$ .............................................. A23G 3/30
[52] U.S. Cl. ........................................ 426/3; 426/654
[58] Field of Search ...................................... 426/3-6, 426/654

[56] References Cited

U.S. PATENT DOCUMENTS 4,371,549  2/1983  Cherukuri ................................. 426/3
4,514,422  4/1985  Yang ........................................ 426/3
4,582,707  4/1986  Calabro .................................... 426/3

Primary Examiner—Jeanette Hunter
Attorney, Agent, or Firm—Gary M. Nath

[57] ABSTRACT

A hydrophilic stabilizing system which comprises a solution wherein gelatin is dissolved in glycerin and water and a chewing gum composition, which comprises: a chewing gum base, sweetening agent and the hydrophilic stabilizing system.

18 Claims, No Drawings

CHEWING GUM WITH LONG LASTING SOFTNESS

The present invention relates to a hydrophilic stabilizing system and particularly to one for use with a chewing gum composition. More particularly this invention relates to a chewing gum composition containing a gelatin/glycerin hydrophilic stabilizing system which composition is able to prepare a flexible chewing gum product having a firm texture and a method for producing the same.

Chewing gum compositions generally comprise a substantially water insoluble, chewable gum base such as chicle or substitutes therefor including jetutong, and natural or synthetic elastomeric resins. Also incorporated within the chewing gum composition, besides flavoring liquids and sweeteners are plasticizers or softeners which improve the consistency and texture of the gum.

Several deficiencies with conventional chewing gums using normal plasticizers or softeners have existed which deficiencies have heretofore only been partially eliminated.

One such deficiency is the long term stability of chewing gums containing glycerin or additional amounts of water, notably their lack of long term shelf stability resulting in a relatively storage unstable product. The prior art has shown that glycerin has been added to the chewing gum formulations as a humectant which also serves as a binder, or hydrophilic plasticizer to bind the large amounts of powder compounds added to the formulation, such as the sweetening and filler components. The use of water has also been employed to soften the formulations. While glycerin enabled the gum to be softened and its presence avoided evaporation of the water present in the gum formulations, the formulations generally required use of low humidity cold rooms to enable them to set up so that they could be scored and wrapped after several days of storage. An additional deficiency of chewing gums containing glycerin was found to be the softer texture relative to the conventionally formulated chewing gums. The softer texture has made the processing and packaging of the glycerin containing gums much more difficult and less efficient. Also because of the hygroscopic nature of glycerin, variations in temperature and relative humidity prior to the packaging, would further tend to soften the gum texture, resulting in poor packaging efficiency.

In contrast, U.S. Pat. No. 4,514,422 to Yang et al discloses the formation of a chewing gum composition which exhibits improved shelf life and resistance to staling. This patentee discloses that chewing gums and bubble gums have been prepared in the past, with the purpose in mind of extending shelf life. Characteristically, gums prepared and stored, even at room temperature for extended periods of time, tend to lose their moisture and elasticity, with the result that they become brittle, and initially crumble when they are placed in the mouth. This problem is particularly noticeable in the instance of sugarless gums, and particularly those gums that are stored in a dry atmosphere, i.e. an atmosphere having less than from 50 to 60% relative humidity.

Yang continues by stating that sugarless gums conventionally contain on the order of about 5% of water, and it was therefore theorized that brittleness or the phenomenon of staling results from the loss of that water, due to evaporation or otherwise, over time. Specifically, most sugarless gums contain large amounts of sorbitol, which serves conventionally as a sweetener, as well as a bulking aid. Sorbitol is known for its tendency to recrystallize in the presence of even small amounts of water, and its tendency to crystallize when the water in which it is dissolved is removed. It was therefore theorized by Yang et al that, as the water containing the sorbitol in the gum composition, is lost by evaporation or otherwise, the sorbitol crystallizes and thus promotes the embrittlement of the gum composition, which contributes to the staling phenomenon. Thus far, the only workable approach to prolonging gum composition freshness relied on the use of fin-seal packaging with water vapor impermeable laminates to exclude all external ambient atmosphere and accompanying moisture and conversely to prevent the egress of moisture from the package contents. This approach is noted as being very costly and has its limitations, as periodic package leakage permits staling to occur unabetted as before.

In accordance with the Yang et al disclosure, a gum composition having improved shelf life and resistance to staling is prepared which comprises a substantially anhydrous mixture of a gum base, at least one sugar alcohol, and glycerin, the glycerin present in an amount from about 8% to about 18% by weight of the gum composition. The gum composition is further characterized by containing no more than 2% by weight of water in any form. More particularly, the gum bases may contain no more than 3.5% by weight of water, the sugar alcohols may contain no more than 0.7% by weight of water and glycerin may contain no more than 1.0% by weight of water.

In addition to these ingredients, Yang et al also employed a variety of other materials, such as plasticizers, softeners and thickeners.

In addition to difficulties associated with addition of free water, problems have also arisen with the use of gelatin in chewing gums. Gelatin has been used as a thickener and is usually dispersed or dissolved in water. This is normally done by dissolving the gelatin in water in amounts of at least 2 parts water to each part of gelatin. It has been found however that this intentional additional of water enhances the staling effect of the gum attributed to the water content present in the thickener system. See for example U.S. Pat. No. 4,233,319 to Fritz et al. Gelatin has also been used as an encapsulating material for flavors to prepare compositions having an extended flavor perception time, true flavor character and controlled release of the flavoring agent. See also U.S. Pat. Nos. 2,886,446 to Kramer et al, 4,292,33 to Latymer and 4,386,106 to Merritt et al.

In accordance with the present invention a hydrophilic stabilizing system is prepared which comprises a solution which contains gelatin dissolved in glycerin and water which system has improved utility as a hydrophilic component in a chewing gum composition. The chewing gum compositions of this invention exhibit improved handling in the packaging process resulting from the firmer texture offered by the rapid set up of the gelatine. The ease of compounding and the forming of gum pieces is also assured by the compositions soft and pliable nature, prior to the complete set up of the gelatine. In addition, the resulting chewing gum compositions have a consistent firm chew, that has a uniform chew character throughout the chewing period coupled with a higher level of flavor stabilization. The chewing gums also have relatively long storage stability without product deterioration. When the compositions are chewed, a firm chew characteristic is evidenced along with an even flavor/sweetness release.

The hydrophilic stabilizing system of this invention must contain gelatin, glycerin and water. The water is used in sufficient amounts to enable the gelatin to become fully hydrated and cause the system to gel. The system may be blended into the chewing gum composition either prior to gel formation or after the gel has begun to polymerize. For ease of processing it is preferred to add the solution to the chewing gum composition prior to the gel setting up and thus enable the polymerization or setting up to be completed after addition to the composition. It should be recognized, however, that a gelled system may be added to the chewing gum composition as is or simply reheated to yield a flowable state and then added.

Once the hydrophilic stabilizing system of this invention is added to the chewing gum composition a composition is able to be prepared and the benefits of using both the gelatin and glycerin can be obtained without their concurrent deficiencies, notably oversoftening of the gum with glycerin or hardening by enhanced staling from the gelatin solution. These formulations, once prepared may be easily processed and readily set up. They also provide a formulation which has a firm texture which assists in the rapid packaging of the product. Once prepared the chewing gum compositions are able to absorb minor amounts of moisture from the surrounding environment which aids in maintaining a chewing gum having a soft character. The softening of the gum however is controlled with the presence of the gelatin which assures an acceptable firm texture even though flexibility does not significantly change from the initial soft, pliable chewing gum piece.

The gelatin used in the hydrophilic stabilizing system of this invention can generally be selected from a wide variety of gelatins having a Bloom value of 100-250. The lower Bloom strength gelatins are preferred from both an economic point of view and the fact that higher Blooms have a tendency to give harder, textures which are unacceptable to manufacturers and consumers of chewing gums. Gelatins having a Bloom strength of 250 or more have a tendency to give significant delayed flavor release but the concurrent gritty texture imparted to the gum is not acceptable.

The gelatin is employed in the hydrophilic stabilizing system in an amount of about 1 to about 10% by weight and preferably about 1 to about 5.5% by weight of the final system. Amounts below about 1% fail to provide sufficient thickener impact upon the gum texture, i.e. make a firm product and tend to form an unacceptable flowable system whereas amounts above about 10% form a product which is too thick and when added to a gum is too hard and unable to be chewed.

The glycerin component of the hydrophilic stabilizing system is used in amounts of about 80% to about 98.5% and preferably from about 90% to about 98.5% by weight of the final system. Amounts below about 80% have been found to be unsuitable to sufficiently soften the chewing gum composition whereas amounts above about 98.5% tend to overly soften the gum and inhibit the beneficial affect sought by the presence of the gelatin.

In addition, to the gelatin and glycerin, water must be employed in the present hydrophilic stabilizing system to enable the gelatin to become hydrated. If the gelatin were to be employed as a powder it would not possess sufficient binding properties to function effectively. Likewise if the gelatin were merely added to water, and dispersed or dissolved and then added to the chewing gum compositions too much water is needed to dissolve the gelatin and the resulting product would become stale during storage.

The water is employed in the inventive system in amounts of about 0.5 to about 10% by weight and preferably from about 0.5 to about 4.5% by weight of the final system.

The hydrophilic stabilizing system of the invention is prepared in any convenient manner such as by mixing the gelatin with the glycerin and then adding water to the mixture while mixing until a homogenous fluid mixture is obtained. A preferred procedure involves adding the gelatin with mixing to the glycerin. Mixing is performed to avoid clumping of the gelatin. Once the addition is complete, the mixture is heated to between 75° C. and 85° C. and the water is gradually added, again with mixing. Mixing is continued until the gelatin is no longer visible, that is a homogenous system is prepared. Once complete, the homogenous stabilizing system is either maintained at a temperature between about 40° C. and about 85° C. and preferably between about 45° C. and about 60° C. and used or stored for future use. The system may also be permitted to gel at lower temperatures and be used or stored as such. If the use of the gelled form is unacceptable for use with a particular formulation, the gel may be simply reheated and used at temperatures again above about 40° C.

The hydrophilic stabilizing system may be employed in chewing gum compositions to provide a composition having excellent initial flavor release while enabling sufficient flexibility to the chewing gum product and permitting the product to have significantly reduced staling potential by reducing moisture loss. The system may be employed in amounts up to about 15% by weight of the final chewing gum composition and preferably in an amount of about 2% to about 10% by weight of the final chewing gum composition. The hydrophilic stabilizing system may be added to chewing gum compositions that contain water in amounts up to about 5% by weight of the final chewing gum composition. More particularly the chewing gum composition may be substantially anhydrous, that is one containing less than about 2% by weight water as well as compositions that contain water in amounts of about 2% to about 5% by weight. The water in the composition is usually present as a component of the ingredients being added such as through glycerin emulsifiers (95% glycerin and 5% water) sorbitol solutions (70% sorbitol and 30% water) and so forth.

Since the hydrophilic stabilizing system is beneficial in providing the unexpected properties to sugar containing and sugarless containing chewing gum compositions it has wide applicability to the chewing gum art in aiding maintenance of flexibility and limiting moisture loss while permitting the formulations to have initial flavor impact from the presence of glycerin, a known humectant. Thus the inventive system obtains the benefits of the use of these materials described in the art without having their concurrent disadvantages.

The chewing gum formulations in which the novel hydrophilic stabilizing system may be employed are not critical and contain the usual ingredients. As described above, the formulations may be either sugar containing or are sugarless chewing gum compositions. In general, the formulations contain gum base in useful amounts which may vary from about 5% to about 65% by weight of the final chewing gum composition, with preferred amounts being about 15% to about 40% by weight and most preferably about 15% to about 25% by weight. The gum base may be any water-insoluble gum base well known in the art. Illustrative examples of suitable polymers useful in gum base include both natural and synthetic elastomers and the rubbers. For example, those polymers which are suitable in gum bases, include, without limitation, substances of vegetable origin such as chicle, jelutong, gutta percha and crown gum. Synthetic elastomers such as butadiene-styrene copolymers, isobutylene-isoprene copolymers, polyethylene, polyisobutylene and polyvinylacetate and mixtures thereof, are particularly useful.

The gum base composition may contain elastomer solvents to aid in softening the rubber component. Such elastomer solvents may comprise methyl, glycerol or pentaerythritol esters of rosins or modified rosins, such as hydrogenated, dimerized or polymerized rosins or mixtures thereof. Examples of elastomer solvents suitable for use herein include the pentaerythritol ester of partially hydrogenated wood rosin and partially hydrogenated wood rosin, pentaerythritol ester of wood rosin, glycerol ester of wood rosin, glycerol ester of partially dimerized rosin, glycerol ester of polymerized rosin, glycerol ester of tall oil rosin, glycerol ester of wood rosin and partially hydrogenated wood rosin and the partially hydrogenated methyl ester of rosin, such as polymers of alpha-pinene or beta-pinene, terpene resins including polyterpene and mixtures thereof. The solvent may be employed in an amount ranging from about 10% to about 75% and preferably about 45% to about 70% by weight to the gum base.

A variety of traditional ingredients such as plasticizers or softeners such as lanolin, stearic acid, sodium stearate, potassium stearate, glyceryl triacetate, glycerine and the like may be employed in the gum base. Useful waxes for example, natural waxes, petroleum waxes such as polyurethene waxes, paraffin waxes and microcrystalline waxes may also be incorporated into the gum base to obtain a variety of desirable textures and consistency properties. These individual additional materials are generally employed in amounts of up to about 30% by weight and preferably in amounts of from about 3% to about 20% by weight of the final gum base composition.

The chewing gum composition may also include the conventional additives such as softeners and plasticizers as discussed above as well as flavoring agents; coloring agents such as titanium dioxide; emulsifiers such as lecithin and glyceryl monostearate; and additional fillers such as aluminum hydroxide, alumina, aluminum silicates, calcium carbonate, and talc. Combinations of these conventional additives are contemplated. These fillers may also be used in the gum base in various amounts. Preferably the amount of fillers when used will vary from about 4% to about 30% by weight of the final chewing gum.

The chewing gum compositions should also include the use of sweeteners well known in the art.

The sweetening agent may be selected from a wide range of materials including water-soluble agents, water-soluble artificial sweeteners, and dipeptide based sweeteners, including mixtures thereof. Without being limited to particular sweeteners, representative illustrations encompass:

A. Water-soluble sweetening agents such as monosaccharides, disaccharides and polysaccharides such as xylose, ribose, glucose, mannose, galactose, fructose, dextrose, sucrose, sugar, maltose, partially hydrolyzed starch, or corn syrup solids and sugar alcohols such as sorbitol, xylitol, mannitol, maltitol, hydrogenated starch hydrolysate and mixtures thereof.

B. Water-soluble artificial sweeteners such as the soluble saccharin salts, i.e., sodium or calcium saccharin salts, cyclamate salts, acesulfam-K, sucralose and the like, and the free acid form of saccharin.

C. Dipeptide based sweeteners such as L-aspartyl-L-phenylalanine methyl ester and materials described in U.S. Pat. No. 3,492,131, L-D-aspartyl-N-(2,2,4,4-tetramethyl-3-thietanyl-D-alaninamide hydrate) and the like.

In general, the amount of sweetener will vary with the desired amount of sweetener selected for a particular chewing gum. This amount will normally be about 0.001% to about 90% by weight of the final chewing gum composition when using an easily extractable sweetener. The water-soluble sweeteners described in category A above, are preferably used in amounts of about 25% to about 80% by weight, and most preferably from about 50% to about 65% by weight of the final chewing gum composition. In contrast, the artificial sweeteners described in categories B and C are used in amounts of about 0.005% to about 5.0% and most preferably about 0.05% to about 2.5% by weight of the final chewing gum composition. These amounts are ordinarily necessary to achieve a desired level of sweetness independent from the flavor level achieved from flavor oils.

The colorants useful in the present invention, include the pigments such as titanium dioxide, which may be incorporated in amounts of up to about 10% by weight, and preferably up to about 6% by weight. Colorants may also include dyes suitable for food, drug and cosmetic applications. These colorants are known as F.D. & C. dyes. The materials acceptable for the foregoing spectrum of use are preferably water-soluble. Illustrative examples include indigo dye, known as F.D. & C. Blue No. 2, which is the disodium salt of 5,5'-indigotin-di-sulfonic acid. Similarly, the dye known as F.D. & C. Green No. 1, comprises a triphenylmethane dye and is the monosodium salt of the 4-[4-Nethyl-p-sulfobenzylamino) diphenylmethylene]-[1-(N-ethyl-N-P-sulfobenzyl)-2, 5-cyclohexadienimini]. A full recitation of F.D. & C. and D. & C. colorants and their corresponding chemical structures may be found in the Kirk-Othmer Encyclopedia of Chemical Technology, in Volume 5, at pages 857–884.

All of the techniques associated with the preparation of the chewing gum products in the forms taught are well known and the present method may vary somewhat depending upon the specific end product to be manufactured without departing from the essential parameters of the invention. Such other details are presented for purposes of illustration, and provide a best mode for the practice of the invention, and therefore the invention should not be limited to those parameters.

A preferred process of preparing a chewing gum composition involves: (a) admixing a chewing gum base at a temperature from about 60° C. to about 90° C. with a softener to obtain a homogenous pliable mixture; (b) while mixing, incrementally add to the homogenous pliable mixture the sweetening agent until a homogenous mass is prepared; (c) the hydrophilic stabilizing system is then added while mixing is continued and then the remaining chewing gum ingredients are added and mixed until a uniform mass is obtained; and (d) thereafter the mixture is formed into suitable chewing gum shapes. The chewing gums of the invention may be in any form known in the art, such as stick gum, slab gum, chunk gum, shredded gum, hard coated gum, tabletted gum, as well as center-filled gum.

The following examples serve to provide further appreciation of the invention but are not meant in any way to restrict the effective scope of the invention. All percentages throughout the specification are by weight % of the final chewing gum composition unless otherwise indicated.

EXAMPLE 1

This Example demonstrates the preparation of a chewing gum composition and bubble gum composition containing the novel stabilizing system compared with a composition lacking the stabilizing system.

Chewing gum pieces were prepared using the formulations set forth in Tables I and II, all components are present by weight % of the total composition. The gum pieces were prepared by mixing a molten gum base with a one-half portion of the bulk sweetening agents until a homogenous mixture was obtained. To this mixture is added the hydrophilic stabilizing system and while mixing the remainder of bulk sweetening agents, aspartame sweetener, flavoring agents, color and softeners are added and blended until a homogenous mixture is formed. The formulations were then prepared into gum pieces.

The chewing gum pieces were subjected to a hardness test using an Instron instrument, with a ⅛" probe at a speed of 254 millimeters per minute and a load range of 10 kilogram force. This test is normally performed on gum pieces one day after manufacture and reflects the force in kilograms necessary to puncture the gum piece of given thickness using the ⅛" probe at the given speed.

The inventive formulations containing the glycerine/gelatine stabilizing system have shown initial hardness values between 1.4 to 2.6 kilogram force. Whereas the hardness values for the comparative formulations containing glycerine were found to be between 1.1 to 15 kilogram force. The firmer inventive formulations have demonstrated significantly improved efficiency when using high speed wrapping machines commonly used in the industry to package chewing gums.

After extended storage at room temperature the inventive formulations were found to have retained the desirable firmer texture relative to the equivalent glycerine containing formulae. This was proven by performing the Instron compression profile test using a 5/16" probe at a speed of 12 millimeters per minute and a load range of 10 kilogram force. The results obtained indicated that the spearmint and bubble gum inventive formulations both were approximately 30% firmer than the comparative formulations made by glycerine alone. The inventive when chewed provided an initial firmer chew character which gradually softened upon chewing whereas the comparative formulations containing glycerin had a soft initial texture which became excessively soft and sticky during subsequent chewing.

TABLE I

| Sugarless Chewing Gum Compositions | | |
| --- | --- | --- |
|  | Inventive | Comparative |
| Gum Base | 30 | 30 |
| Sorbitol, crystalline | 32.66 | 32.66 |
| Mannitol | 12 | 12 |

TABLE I-continued

| Sugarless Chewing Gum Compositions | | | |
| --- | --- | --- | --- |
|  |  | Inventive | Comparative |
| Xylitol |  | 10 | 10 |
| Stabilizing system |  | 9.0 | — |
| Glycerin | 8.6 |  |  |
| Gelatin | 0.25 |  |  |
| Water | 0.15 |  |  |
| Glycerin |  | — | 9.0 |
| Flavor mix (Spearmint) |  | 6 | 6 |
| Aspartame Sweetener |  | 0.34 | 0.34 |

TABLE II

| Sugarless Bubble Gum | | | |
| --- | --- | --- | --- |
|  |  | Inventive | Comparative |
| Gum Base |  | 26 | 26 |
| Sorbitol |  | 34.55 | 34.55 |
| Mannitol |  | 10 | 10 |
| Xylitol |  | 15 | 15 |
| Stabilizing solution |  | 12 | — |
| Glycerin | 11.20 |  |  |
| Gelatin | 0.48 |  |  |
| Water | 0.32 |  |  |
| Glycerin |  | — | 12 |
| Lecithin |  | 0.5 | 0.5 |
| Aspartame |  | 0.35 | 0.35 |
| Flavor (bubble gum) |  | 1.60 | 1.60 |

EXAMPLE II

The procedure of Example I was repeated to prepare chewing gum compositions containing the novel stabilizing system of this invention. The formulations are set forth in Table III. These formulations when chewed exhibited a firm initial texture which upon chewing become softer. Additionally, these formulations did not demonstrate any staling during storage under ambient conditions.

TABLE III

|  | Spearmint Flavor | Peppermint Flavor |
| --- | --- | --- |
| Gum Base | 30 | 30 |
| Sorbitol Crystalline | 34.65 | 34.4 |
| Mannitol | 12.0 | 14 |
| Xylitol | 10 | 10 |
| Stabilizing system | 8.0 | 7.5 |
| Glycerin |  |  |
| Gelatin |  |  |
| Water |  |  |
| Flavor mix | 5.0 | 3.75 |
| Aspartame sweetener | 0.35 | 0.35 |
| Initial Hardness by Instrom TM, kg force | 1.78 | 2.54 |

EXAMPLE III

This Example demonstrates the application of the hydrophilic stabilizing system with the purpose of reducing the noted staling or drying out of the conventional glucose syrup and sucrose containing chewing gum on extended storage.

The conventional chewing gum formulation was prepared by melting gum base first, blending in glucose syrup and a small amount of glycerine, followed by mixing in pulverized sugar, the flavoring and coloring agents. The resulting chewing gum was cooled, extruded and formed into gum pieces.

The inventive example has been prepared in similar fashion with the difference of replacing approximately 40% of the glucose syrup with an equivalent amount of the glycerine/gelatine hydrophyllic stabilizer.

The result showed that on extended storage at room temperature the conventional formulation due to the characteristic hardening effect exhibited by the glucose syrup became approximately twice harder as the inventive example containing the glycerine/gelatine hydrophyllic stabilizer.

A compression profile test using the Instron under the conditions described for Example I showed a reading of 90.8 kilogram force total energy of deformation for the 4 month old conventional sucrose/glucose formula whereas the identically aged inventive gum formulation has tested 48.0 kg force energy of deformation.

The inventive formulation when chewed provided a firm chew character at the start which upon quick interaction with the saliva resulted in desirable soft and moist chew character. The comparative formulation was found to be hard and dry when chewed first and it required prolonged chewing before attaining the desirable soft and moist chew character.

TABLE IV

|  |  | Inventive | Comparative |
|---|---|---|---|
| Gum Base |  | 26.0 | 27.6 |
| Glucose Syrup 44° Be |  | 6.4 | 10.7 |
| Sugar, pulverized |  | 58.9 | 56.4 |
| Stabilizing system |  | 4.1 | — |
| Glycerin | 3.84 |  |  |
| Gelatine | 0.16 |  |  |
| Water | 0.10 |  |  |
| Glycerin |  | — | 0.3 |
| Lecithin |  | 0.8 | 0.9 |
| Flavoring Agents |  | 3.70 | 4.0 |
| Color |  | 0.1 | 0.10 |

This invention being thus described, it will be obvious that the same may be varied in many ways. Such variations are not to be regarded as a departure from the spirit and scope of the invention and all such modifications are intended to be included within the scope of the following claims.

We claim:

1. A chewing gum composition, which comprises: a chewing gum base, sweetening agent and separate hydrophilic stabilizing system comprising 80 to 98.5% glycerin, 1 to 10% gelatin and 0.5 to 10% water, all percents being by weight of the system.

2. The chewing gum composition of claim 1, wherein the hydrophilic stabilizing system contains about 90% to about 98.5% glycerin, about 1% to about 5.5% gelatin and about 0.5 to about 4.5% by weight water, all percents being by weight of the system.

3. The chewing gum composition of claim 1, wherein the chewing gum is a sugar or sugarless containing chewing gum composition.

4. The chewing gum composition of claim 1, wherein the gum base comprises an elastomer selected from the group consisting of natural rubber, synthetic rubber and mixtures thereof.

5. The chewing gum composition of claim 4, wherein the gum base elastomer is selected from the group consisting of chicle, jelutong, balata, gutta-percha, lechicapsi, sorva, butadiene-styrene copolymers, polyisobutylene, isobutylene-isoprene copolymers, polyethylene, polyvinylacetate, and mixtures thereof.

6. The chewing gum composition of claim 1, wherein the gum base is present in an amount of about 5% to about 60% by weight of the final chewing gum composition.

7. The chewing gum composition of claim 1, wherein the sweetening agent is selected from the group consisting of sugar, sugar alcohols and mixtures thereof.

8. The chewing gum composition of claim 1, wherein the sweetening agent is present in an amount of about 0.001% to about 90% by weight of the final chewing gum composition.

9. The chewing gum composition of claim 1, wherein the hydrophilic stabilizing system is present in an amount up to about 15% by weight of the final chewing gum composition.

10. The chewing gum composition of claim 1, wherein the hydrophilic stabilizing system is present in an amount of about 2 to about 10% by weight of the final chewing gum composition.

11. The chewing gum composition of claim 1, wherein the composition contains water in an amount up to about 5% by weight of the final chewing gum composition.

12. The chewing gum composition of claim 11, wherein the composition contains about 2 to about 5% water by weight of the final chewing gum composition.

13. The chewing gum composition of claim 1, wherein the composition is a substantially anhydrous chewing gum composition.

14. The chewing gum composition of claim 1, wherein there is additionally included fillers, coloring agents, flavoring agents, softeners, plasticizers, and mixtures thereof.

15. The chewing gum composition of claim 14, wherein the flavoring agents are selected from the group consisting of spearmint oil, cinnamon oil, oil of wintergreen (methylsalicylate), peppermint oil, lemon oil, orange oil, grape oil, lime oil, grapefruit oil, apple essence, strawberry essence, cherry essence, pineapple essence, banana oil and mixtures thereof.

16. The chewing gum composition of claim 1, wherein the sweetening agent is selected from the group consisting of water-soluble sweetening agents, water-soluble artificial sweeteners, dipeptide based sweeteners and mixtures thereof.

17. The chewing gum composition of claim 16, wherein the sweetening agent is selected from the group consisting of saccharin acid, saccharin salts, cyclamate salts, acesulfame-K, L-aspartyl-L-phenylalanine methyl ester, xylose, ribose, glucose, mannose, galactose, fructose, dextrose, sucrose, sugar, maltose, partially hydrolyzed starch or corn syrup solids, sorbitol, xylitol, mannitol; talin, dihydrochalcone; glycyrrhizin; stevia rebaudiana (stevioside); sucralose and mixtures thereof.

18. A hydrophilic stabilizing system which comprises a solution wherein gelatin is dissolved in glycerin and water and wherein the system contains 80 to 98.5% glycerin, 1 to 10% gelatin and 0.5 to 10% water, all percents being by weight of the final system.

* * * * *